United States Patent
Oztaskent et al.

(10) Patent No.: US 12,222,951 B2
(45) Date of Patent: *Feb. 11, 2025

(54) AIDING DISCOVERY OF PROGRAM CONTENT BY PROVIDING DEEPLINKS INTO MOST INTERESTING MOMENTS VIA SOCIAL MEDIA

(71) Applicant: Google LLC, Mountain View, CA (US)

(72) Inventors: Ant Oztaskent, Surrey (GB); Gjokica Zafirovski, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,791

(22) Filed: Aug. 28, 2023

(65) Prior Publication Data

US 2023/0401220 A1    Dec. 14, 2023

Related U.S. Application Data

(63) Continuation of application No. 17/496,967, filed on Oct. 8, 2021, now Pat. No. 11,741,110, which is a
(Continued)

(51) Int. Cl.
*G06F 16/90*    (2019.01)
*G06F 3/0482*    (2013.01)
(Continued)

(52) U.S. Cl.
CPC ...... *G06F 16/24578* (2019.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS

| 5,561,457 A | 10/1996 | Cragun et al. |
| 5,561,467 A | 10/1996 | Takeuchi et al. |

(Continued)

FOREIGN PATENT DOCUMENTS

| WO | WO 2004095426 | 11/2004 |
| WO | WO 2009105486 | 8/2009 |

(Continued)

OTHER PUBLICATIONS

Examination Report dated Jan. 9, 2018 in European Patent Application No. 13832958.6.
(Continued)

*Primary Examiner* — Belix M Ortiz Ditren
(74) *Attorney, Agent, or Firm* — Brake Hughes Bellermann LLP

(57) ABSTRACT

A computerized method, system for, and computer-readable medium operable to: retrieve program details data about at least one media program. Retrieve social media posts involving the at least one media program. Match the retrieved program details data with the retrieved social media posts to find matching locations. Store time offset data corresponding to the matched locations within the at least one media program into at least one micropost. Rank the at least one media program by the number of microposts corresponding to the at least one media program. Present the at least one media program, each of the at least one media program with at least one micropost, wherein the at least one micropost comprises a link to the original social media page hosting the social media post and a video deeplink that plays a time off-set video, the time off-set video starting from the stored time offset data.

21 Claims, 7 Drawing Sheets

Related U.S. Application Data continuation of application No. 15/707,660, filed on Sep. 18, 2017, now Pat. No. 11,144,557, which is a continuation of application No. 14/987,354, filed on Jan. 4, 2016, now Pat. No. 9,767,162, which is a continuation of application No. 13/601,722, filed on Aug. 31, 2012, now Pat. No. 9,237,386.

(51) Int. Cl.
| | | |
|---|---|---|
| *G06F 3/04842* | (2022.01) | |
| *G06F 16/2457* | (2019.01) | |
| *G06F 16/435* | (2019.01) | |
| *G06F 16/583* | (2019.01) | |
| *G06F 16/78* | (2019.01) | |
| *G06F 16/9535* | (2019.01) | |
| *G06F 16/9536* | (2019.01) | |
| *G06F 16/9537* | (2019.01) | |
| *G06F 16/9538* | (2019.01) | |
| *H04N 21/4782* | (2011.01) | |
| *H04N 21/643* | (2011.01) | |
| *H04N 21/81* | (2011.01) | |
| *G06Q 50/00* | (2012.01) | |

(52) U.S. Cl.
CPC ........ *G06F 16/435* (2019.01); *G06F 16/5846* (2019.01); *G06F 16/7867* (2019.01); *G06F 16/9535* (2019.01); *G06F 16/9536* (2019.01); *G06F 16/9537* (2019.01); *G06F 16/9538* (2019.01); *H04N 21/4782* (2013.01); *H04N 21/64322* (2013.01); *H04N 21/812* (2013.01); *G06Q 50/01* (2013.01)

(56) References Cited

U.S. PATENT DOCUMENTS

| | | |
|---|---|---|
| 6,173,287 B1 | 1/2001 | Eberman et al. |
| 6,332,144 B1 | 12/2001 | deVries et al. |
| 7,257,774 B2 | 8/2007 | Denoue et al. |
| 7,669,123 B2 | 2/2010 | Zuckerberg et al. |
| 7,689,104 B2 | 3/2010 | Ono et al. |
| 8,204,897 B1 | 6/2012 | Djabarov et al. |
| 8,260,852 B1 | 9/2012 | Cselle |
| 8,321,463 B2 | 11/2012 | Cierniak et al. |
| 8,396,879 B1 | 3/2013 | Cierniak et al. |
| 8,656,266 B2 | 2/2014 | Cierniak |
| 8,775,350 B1 | 7/2014 | Hall et al. |
| 9,176,949 B2 | 11/2015 | Bullock et al. |
| 9,454,518 B1 | 9/2016 | Grimm |
| 9,998,797 B2 | 6/2018 | Maruyama et al. |
| 10,063,910 B1* | 8/2018 | Yelton ................ H04N 21/4316 |
| 10,529,377 B2 | 1/2020 | Zhang et al. |
| 2003/0005457 A1 | 1/2003 | Faibish et al. |
| 2003/0061214 A1 | 3/2003 | Alpha |
| 2004/0021685 A1 | 2/2004 | Denoue et al. |
| 2006/0218179 A1 | 9/2006 | Gardner et al. |
| 2006/0271977 A1 | 11/2006 | Lerman et al. |
| 2007/0033228 A1 | 2/2007 | Fassett et al. |
| 2007/0038567 A1 | 2/2007 | Allaire et al. |
| 2007/0078671 A1 | 4/2007 | Dave et al. |
| 2007/0186754 A1 | 8/2007 | Cho et al. |
| 2007/0245243 A1 | 10/2007 | Lanza et al. |
| 2007/0255831 A1 | 11/2007 | Hayashi et al. |
| 2008/0005064 A1 | 1/2008 | Sarukkai |
| 2008/0027921 A1 | 1/2008 | Chandrasekar et al. |
| 2008/0177752 A1 | 7/2008 | Kulkarni et al. |
| 2009/0006371 A1 | 1/2009 | Denoue et al. |
| 2009/0007167 A1 | 1/2009 | Artom |
| 2009/0083383 A1 | 3/2009 | Piper et al. |
| 2009/0106235 A1 | 4/2009 | Tankovich et al. |
| 2009/0119598 A1 | 5/2009 | Oztaskent |
| 2009/0164904 A1 | 6/2009 | Horowitz et al. |
| 2009/0319436 A1 | 12/2009 | Andra et al. |
| 2010/0082727 A1 | 4/2010 | Zalewski |
| 2010/0083307 A1 | 4/2010 | Zalewski |
| 2010/0121867 A1 | 5/2010 | Gosejacob |
| 2010/0153848 A1 | 6/2010 | Saha |
| 2010/0162093 A1 | 6/2010 | Ciemniak |
| 2010/0169327 A1 | 7/2010 | Lindsay et al. |
| 2010/0169906 A1 | 7/2010 | Takahashi |
| 2010/0241968 A1 | 9/2010 | Tarara et al. |
| 2010/0306708 A1 | 12/2010 | Trenz et al. |
| 2010/0319031 A1 | 12/2010 | Lee et al. |
| 2011/0029512 A1 | 2/2011 | Folgner et al. |
| 2011/0043652 A1 | 2/2011 | King et al. |
| 2011/0106718 A1 | 5/2011 | Roberts et al. |
| 2011/0167077 A1 | 7/2011 | Govani et al. |
| 2011/0246471 A1 | 10/2011 | Rakib |
| 2011/0246495 A1 | 10/2011 | Mallinson |
| 2011/0258545 A1 | 10/2011 | Hunter |
| 2011/0289098 A1 | 11/2011 | Oztaskent et al. |
| 2011/0307464 A1 | 12/2011 | Ghosh |
| 2012/0036085 A1 | 2/2012 | Srivastava |
| 2012/0089905 A1 | 4/2012 | Chafy et al. |
| 2012/0166453 A1 | 6/2012 | Broder |
| 2012/0311624 A1 | 12/2012 | Oskolkov et al. |
| 2012/0330968 A1 | 12/2012 | Lee et al. |
| 2013/0004141 A1 | 1/2013 | Wu et al. |
| 2013/0031100 A1 | 1/2013 | Graham et al. |
| 2013/0080427 A1 | 3/2013 | Cross et al. |
| 2013/0145269 A1 | 6/2013 | Latulipe et al. |
| 2013/0201833 A1 | 8/2013 | Masputra et al. |
| 2013/0204833 A1 | 8/2013 | Pang et al. |
| 2014/0068654 A1 | 3/2014 | Marlow et al. |
| 2014/0140680 A1 | 5/2014 | Jo |
| 2014/0201180 A1 | 7/2014 | Fatourechi et al. |
| 2014/0237510 A1* | 8/2014 | Phillips ................ H04N 21/235 725/34 |
| 2014/0333720 A1 | 11/2014 | Huang et al. |
| 2015/0110470 A1 | 4/2015 | Zhang et al. |
| 2016/0149956 A1* | 5/2016 | Birnbaum ............. H04L 63/101 726/1 |
| 2016/0283097 A1 | 9/2016 | Voss |
| 2017/0220677 A1 | 8/2017 | Kazi et al. |
| 2018/0158489 A1 | 6/2018 | Avedissian et al. |
| 2019/0052939 A1* | 2/2019 | Wang ................ H04N 21/4826 |

FOREIGN PATENT DOCUMENTS

| | | |
|---|---|---|
| WO | WO 2009148756 | 12/2009 |
| WO | WO 2011079477 | 7/2011 |
| WO | WO 2012151218 | 11/2012 |

OTHER PUBLICATIONS

Examination Report dated Dec. 2, 2016 in European Patent Application No. 13832958.6.
Extended European Search Report dated Mar. 2, 2016 in European Patent Application No. 13832958.6.
Fose, Luanne, "Youtube Tips Introduction", last updated Oct. 1, 2010, pp. 1-7, available at: http://www.calpoly.edu/~lfose/tutorials/YouTube_Tips_Tutorial.pdf, last accessed May 19, 2015.
International Search Report and Written Opinion dated Oct. 18, 2013 in International Patent Application No. PCT/US2013/049918.
Madden, et al., "A Classification Scheme for Content Analyses of YouTube Video Comments", Journal of Documentation, vol. 60, No. 5, Sep. 2013, pp. 693-714.
Notice of Allowance dated Feb. 8, 2023 in U.S. Appl. No. 17/163,887.
Notice of Allowance dated Mar. 21, 2013 in U.S. Appl. No. 13/762,535.
Notice of Allowance dated Apr. 12, 2023 in U.S. Appl. No. 17/496,967.
Notice of Allowance dated May 24, 2017 in U.S. Appl. No. 14/987,354.
Notice of Allowance dated Jun. 9, 2021 in U.S. Appl. No. 15/707,660.
Notice of Allowance dated Sep. 1, 2015 in U.S. Appl. No. 13/601,722.
Notice of Allowance dated Oct. 2, 2020 in U.S. Appl. No. 15/189,658.
Office Action dated Jan. 9, 2020 in U.S. Appl. No. 15/707,660.
Office Action dated Jan. 28, 2015 in U.S. Appl. No. 13/762,535.

(56) References Cited

OTHER PUBLICATIONS

Office Action dated Feb. 7, 2020 in U.S. Appl. No. 15/189,658.
Office Action dated Apr. 11, 2019 in U.S. Appl. No. 15/189,658.
Office Action dated Apr. 29, 2019 in KR Patent Application No. 10-2015-7007696.
Office Action dated May 28, 2020 in U.S. Appl. No. 15/189,658.
Office Action dated Jun. 3, 2013 in U.S. Appl. No. 13/762,535.
Office Action dated May 18, 2017 in CN Patent Application No. 201380055449.1.
Office Action dated Jun. 27, 2019 in U.S. Appl. No. 15/707,660.
Office Action dated Jul. 8, 2020 in U.S. Appl. No. 15/707,660.
Office Action dated Jul. 25, 2019 in U.S. Appl. No. 15/189,658.
Office Action dated Aug. 27, 2014 in U.S. Appl. No. 13/762,535.
Office Action dated Sep. 25, 2015 in U.S. Appl. No. 13/762,535.
Office Action dated Sep. 30, 2019 in KR Patent Application No. 10-2015-7007696.
Office Action dated Oct. 3, 2022 in U.S. Appl. No. 17/496,967.
Office Action dated Oct. 5, 2022 in U.S. Appl. No. 17/163,887.
Office Action dated Oct. 9, 2014 in U.S. Appl. No. 13/601,722.
Office Action dated Dec. 10, 2020 in U.S. Appl. No. 15/707,660.
Office Action dated Dec. 16, 2013 in U.S. Appl. No. 13/762,535.
Office Action dated Dec. 19, 2013 in U.S. Appl. No. 13/601,722.
Office Action dated Dec. 20, 2016 in U.S. Appl. No. 14/987,354.
Sawada, K., et al., "Clustering of Videos on a Video Sharing Site Using User-Contributed Comments", In Proceedings of the 44th Hawall International Conference on System Sciences, Kauai, HI, USA, Jan. 4-7, 2011, pp. 1-7.

\* cited by examiner

AIDING DISCOVERY OF PROGRAM CONTENT BY PROVIDING DEEPLINKS INTO MOST INTERESTING MOMENTS VIA SOCIAL MEDIA

CROSS-REFERENCE TO RELATED APPLICATIONS

This application is a continuation of U.S. patent application Ser. No. 17/496,967, filed Oct. 8, 2021, which is a continuation of U.S. patent application Ser. No. 15/707,660, filed Sep. 18, 2017, which is a continuation of U.S. patent application Ser. No. 14/987,354, filed Jan. 4, 2016, which is a continuation of U.S. patent application Ser. No. 13/601,722, filed Aug. 31, 2012, each of which is hereby incorporated by reference herein in its entirety.

BACKGROUND

The present disclosure relates generally to social media services and content programming viewable via television or online.

Users of social media services may create posts that correspond to, e.g., television or internet-based shows that they are watching, particularly with the rise of more television content that is directly or exclusively available online. A user may be watching a television program, for example, and upon hearing a particularly interesting piece of dialogue or watching a particularly memorable or notable moment, may post a message or status update on a social media service quoting the dialogue or summarizing the moment. However, there may not be a convenient way to organize social media messages or status updates pertaining to television or internet-based shows. Also, content discovery across many sites that broadcast media programs may be difficult because no single web site has all the content.

SUMMARY

A computerized method, system for, and computer-readable medium operable to retrieve program details data about at least one media program. Retrieve social media posts involving the at least one media program. Match the retrieved program details data with the retrieved social media posts to find matching locations. Store time offset data corresponding to the matched locations within the at least one media program into at least one micropost. Rank the at least one media program by the number of microposts corresponding to the at least one media program. Present the at least one media program, each of the at least one media program with at least one micropost, wherein the at least one micropost comprises a link to the original social media page hosting the social media post and a video deeplink that plays a time off-set video, the time off-set video comprising video from the at least one media program starting from the stored time offset data.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

Figure 1A:
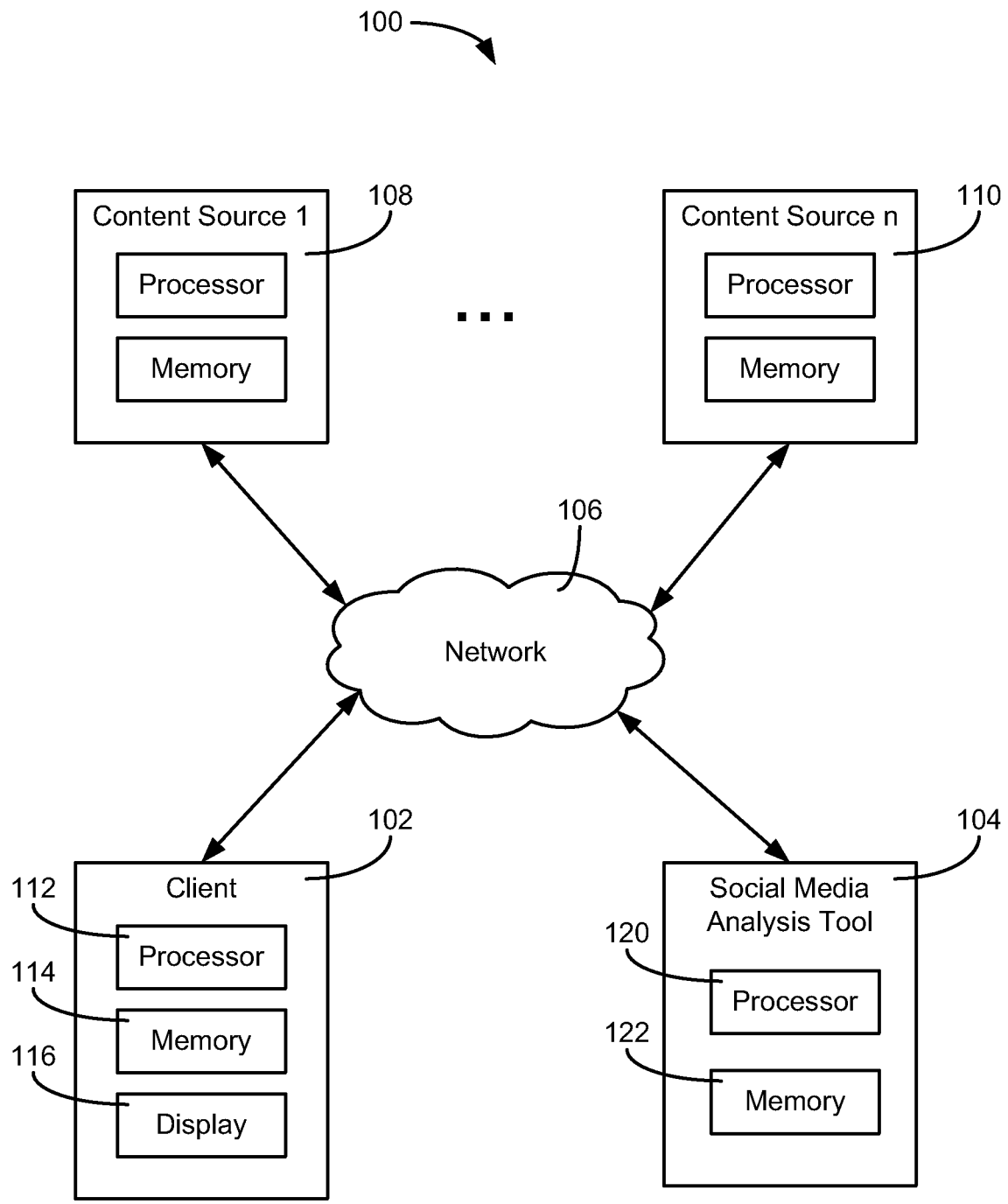
FIG. 1A is a block diagram of a computer system in accordance with an aspect of the present disclosure.

According to aspects of the present disclosure, social media activity may be analyzed and organized in order to aid in the discovery of content, and also used to provide deeplinks (for example video deeplinks) into the most interesting moments so as to make those moments "watchable" for helping users decide what to watch. As used herein, social media activity may refer to posts, messages and other status updates made on various social media programs or websites, either via a computer or a phone. Deeplinks may refer to a link to a media source where a program may be viewed over the internet or demand, and may be played back beginning at a particular time index. According to an aspect of the present disclosure, the most interesting moments may correspond to the number of social media posts pertaining to a particular moment in a media program.

According to one aspect of the present disclosure, a tool is provided that analyzes social media to identify a quotation from a media program such as a television series, an online-based web series, a podcast, or other broadcast media program, herein referred to as a program, television program, show or television show for simplicity. Users of social media services may create posts that correspond to, e.g., programs that they are watching. A user may be watching a program and, upon hearing a particularly interesting piece of dialogue, post a message on a social media service quoting the dialogue or summarizing a portion of the program. The analysis tool, in turn, can monitor social media services for new messages, posts or activity as they are published. For example, when the user publishes the post quoting the dialogue from the program, the analysis tool can then identify that the quote corresponds to dialogue from the television program by matching the quotation to caption or subtitle information corresponding to a transcript of the program. The caption or subtitle information also includes time index information. Using the time index information, a match against a particular section of the program transcript can be used to determine a time index into the television program corresponding to the quoted dialogue matched from the user's social media post.

According to an aspect of the present disclosure, the analysis tool can use the time index into the television program to generate a "deeplink" A deeplink links to a media source where the television program, for instance, may be viewed over the internet on demand. The deeplink may be configured such that, when followed, it causes the selected portion of the television program to be played back on demand, beginning at a time index into the program corresponding to the quotation. A deeplink may be provided, e.g., to portions of the program that are determined to be especially interesting. The relative interest of viewers in portions of the program may be determined by analyzing the social media data that is collected. For example, if many different users post messages to social media that are determined to correspond to the same portion of a program, that portion of the program may be determined to be more interesting than portions of the program corresponding to fewer public posts (or status updates, messages), or to no posts. Similarly, other metrics of public approval in social media services may be leveraged. For example, the number of users who "like", "plus one" or otherwise approve a post, or who share the post by rebroadcasting it to their own social groups and circles may be used as relative interest/popularity of a given portion of a television program. Such analysis of popularity and interest may also be used to rank shows relative to one another, and/or to provide a suggested playlist of popular sections of recently broadcasted shows or programs.

According to an aspect of the present disclosure, the system may include all, some of, or combinations of: a program details importer, a related micropost importer, a quote detector, an offset deeplink calculator, a program ranker, a frontend and an user interface. According to an aspect of the present disclosure, a process may use any, all, some or combinations of the above components in any order in order to analyze and organize social media to discover the most interesting content and providing it to a user in a convenient fashion, such as through a simple-to-use user interface on a webpage or other display.

FIG. 1A is a block diagram of a computer system in accordance with an aspect of the present disclosure. Referring to FIG. 1A, a block diagram of a computer system 100 in accordance with a described implementation is shown. System 100 includes a client 102 which communicates with other computing devices via a network 106. Client 102 may execute a web browser or other application (e.g., a video game, a messaging program, etc.) to retrieve content from other devices over network 106. For example, client 102 may communicate with any number of content sources 108, 110 (e.g., a first content source through nth content source), which provide electronic content to client 102, such as web page data and/or other content (e.g., text documents, PDF files, and other forms of electronic documents). In some implementations, computer system 100 may also include a social media analysis tool 104 configured to analyze and organize social media posts on a particular topic, for instance, television shows or other similar media. For example, the social media analysis tool 104 may analyze and organize data provided by a social media service used by client 102. Social media analysis tool 104 may also provide data to content sources 108, 110 that is used by content source 108, 110 to select relevant content for client 102. In other implementations, social media analysis tool 104 may itself select relevant content for client 102 based on content associated with client 102. In other implementations, social media analysis tool 104 may use, organize or analyze data provided by content source 108, 110.

Network 106 may be any form of computer network that relays information between client 102, content sources 108, 110, and social media analysis tool 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT 5 cable, etc.) to other computing devices in network 106.

Client 102 may be any number of different types of electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM DVD, magnetic disk, memory chip, ROM RAM EEPROM, EPROM, flash memory, optical media, or any other suitable memory from which processor 112 can read instructions. The instructions may include code from any suitable computer programming language such as, but not limited to, C, C++, C #, Java, JavaScript, Perl, HTML XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays web pages and other forms of content received from content sources 108, 110 and/or social media analysis tool 104.

Content sources 108, 110 may be one or more electronic devices connected to network 106 that provide content to client 102. For example, content sources 108, 110 may be computer servers (e.g., FTP servers, file sharing servers, web servers, etc.) or combinations of servers (e.g., data centers, cloud computing platforms, etc.). Content may include, but is not limited to, web page data, a text file, a spreadsheet, an image file, social media data (posts, messages, status updates), media files, video files, and other forms of electronic documents. Similar to client 102, content sources 108, 110 may include processing circuits comprising processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

Social media analysis tool 104 may be one or more electronic devices connected to network 106 and configured to analyze and organize social media services associated with client 102 and/or other clients. Social media analysis tool 104 may be a computer server (e.g., FTP servers, file sharing servers, web servers, etc.) or a combination of servers (e.g., a data center, a cloud computing platform, etc.). Social media analysis tool 104 may also include a processing circuit including a processor 120 and a memory 122 that stores program instructions executable by processor 120. In cases in which social media analysis tool 104 is a combination of computing devices, processor 120 may represent the collective processors of the devices and memory 122 may represent the collective memories of the devices. In other implementations, the functionality of social media analysis tool 104 may be integrated into content sources 108, 110 or other devices connected to network 106.

Social media analysis tool 104 may store user identifiers to represent users of computing system 100. A user identifier may be associated with one or more client identifiers. For example, a user identifier may be associated with the network address of client 102 or a cookie that has been set on client 102. A user identifier may be associated with any number of different client identifiers. For example, a user identifier may be associated with a device identifier for client 102 and another client device connected to network 106. In other implementations, a device identifier for client 102 may itself be used in computing system 100 as a user identifier.

In the instance where the user of client 102 consents in advance to the use of such data, the user of client 102 may allow social media analysis tool 104 to identify and store data relating to client 102 and the user. For example, the user may elect to receive content selected by social media analysis tool 104 that may be more relevant to him or her. In one implementation, a client identifier and/or device identifier for client 102 may be anonymized and contain no personally-identifiable information about the user of client 102. Thus, the user of client 102 may have control over how information is collected about the user and used by social media analysis tool 104, in various implementations.

In cases in which the user of client 102 elects to receive more relevant content, social media analysis tool 104 may determine types of television shows or other related programs that client 102 may wish to watch. In some implementations, an analysis of popular programs that users may wish to watch may be determined by social media analysis tool 104 by analyzing activity associated with the set of user identifiers. In general, any data indicative of an online action (or a behavior on a social media service) associated with a user identifier may be used as a signal by social media analysis tool 104. For example, a signal associated with a user identifier may be indicative of posting or sharing on a social media service about a particular show, watching a particular show, visiting a particular web page or website, selecting an advertisement or other form of content, receiving content related to a particular topic, etc. Signals may be stored by social media analysis tool 104 in memory 122 and retrieved by processor 120 to generate program popularity ranks or other such scores or metrics. In some implementations, signals may be received by social media analysis tool 104 from content sources 108, 110. For example, content source 108 may provide data to social media analysis tool 104 regarding client 102 visiting a web page (or playing videos or shows) that is served by content source 108. In further implementations, data regarding online actions associated with client 102 may be provided by client 102 to social media analysis tool 104 for analysis purposes. Furthermore, in one implementation, no personally identifiable information would be stored by the system, and stored actions may not be associated with specific users.

In some implementations, a client device that uses network 106 may provide data regarding an online action to social media analysis tool 104 in response to executing a content tag that is part of a web page from content sources 108, 110. A content tag refers to any piece of web page code associated with including additional content in conjunction with the web page. For example, a content tag may define how a video file is played, what media player should be used while playing the video file, a slot on a web page for additional content, a slot for off page content (e.g., interstitial content), whether content should be loaded asynchronously or synchronously, whether the loading of content should be disabled on the web page, whether content that loaded unsuccessfully should be refreshed, the network location of a content source that provides the content (e.g., content sources 108, 110, similarity evaluator 104, etc.), a network location (e.g., a URL) associated with selecting the content (e.g., by clicking on the content, highlighting the content, etc.), how the content is to be rendered on a display, one or more keywords used to retrieve the content, and other functions associated with providing additional content in conjunction with a web page. For example, content source 108 may provide web page data that causes client 102 to contact social media analysis tool 104 when the web page is loaded by client 102. In this way, social media analysis tool 104 may store signal data regarding the visit by client 102 to the web page (e.g., an identifier for the visited web page, an access time for the visited web page, a topic of the web page, what videos were played on-demand from the website, etc.).

A set of one or more user identifiers may be evaluated by social media analysis tool 104 to determine how strongly a particular signal relates to the user identifiers in the set. The set may be selected randomly or based on one or more characteristics of the set. For example, the set may be selected for evaluation based on geographic data associated with the set (e.g., user identifiers associated with a particular geographic region), based on one or more signals associated with the identifiers (e.g., user identifiers associated with reviewing content about a certain topic, shows based on genre, shows based on targeted audience base), any other characteristic, or a combination thereof. In some implementations, social media analysis tool 104 may determine the strength of association between a signal and the set using a statistical measure of association. For example, social media analysis tool 104 may determine the strength of association between the set and a particular signal using a point-wise mutual information (PMI) score, a Hamming distance analysis, a term-frequency inverse-document-frequency (TF-IDF) score, a mutual information score, a Kullback-Leibler divergence score, any other statistical measure of association, or combinations thereof.

In some implementations, social media analysis tool 104 may find a way to rank programs or television shows by popularity based on the activity of the set of one or more user identifiers, and an analysis of a wide set of user identifiers. For example, the set of user identifiers that watches television at a particular time of the week. Based on this analysis, the social media analysis tool 104 may select relevant content for client 102 that would most likely be the content that client 102 would wish to watch.

Relevant content may be provided to client 102 by content sources 108, 110 or social media analysis tool 104. For example, social media analysis tool 104 may select relevant content from content source 110 to be included with a web page served by content source 108. In another example, social media analysis tool 104 may provide the selected content to client 102 via a deeplink or video deeplink. In some implementations, social media analysis tool 104 may select content stored in memory 114 of client 102. For example, previously provided content may be cached in memory 114, content may be preloaded into memory 114 (e.g., as part of the installation of an application), or may exist as part of the operating system of client 102. In such a case, social media analysis tool 104 may provide an indication of the selection to client 102. In response, client 102 may retrieve the selected content from memory 114 and display it on display 116.

Figure 1B:
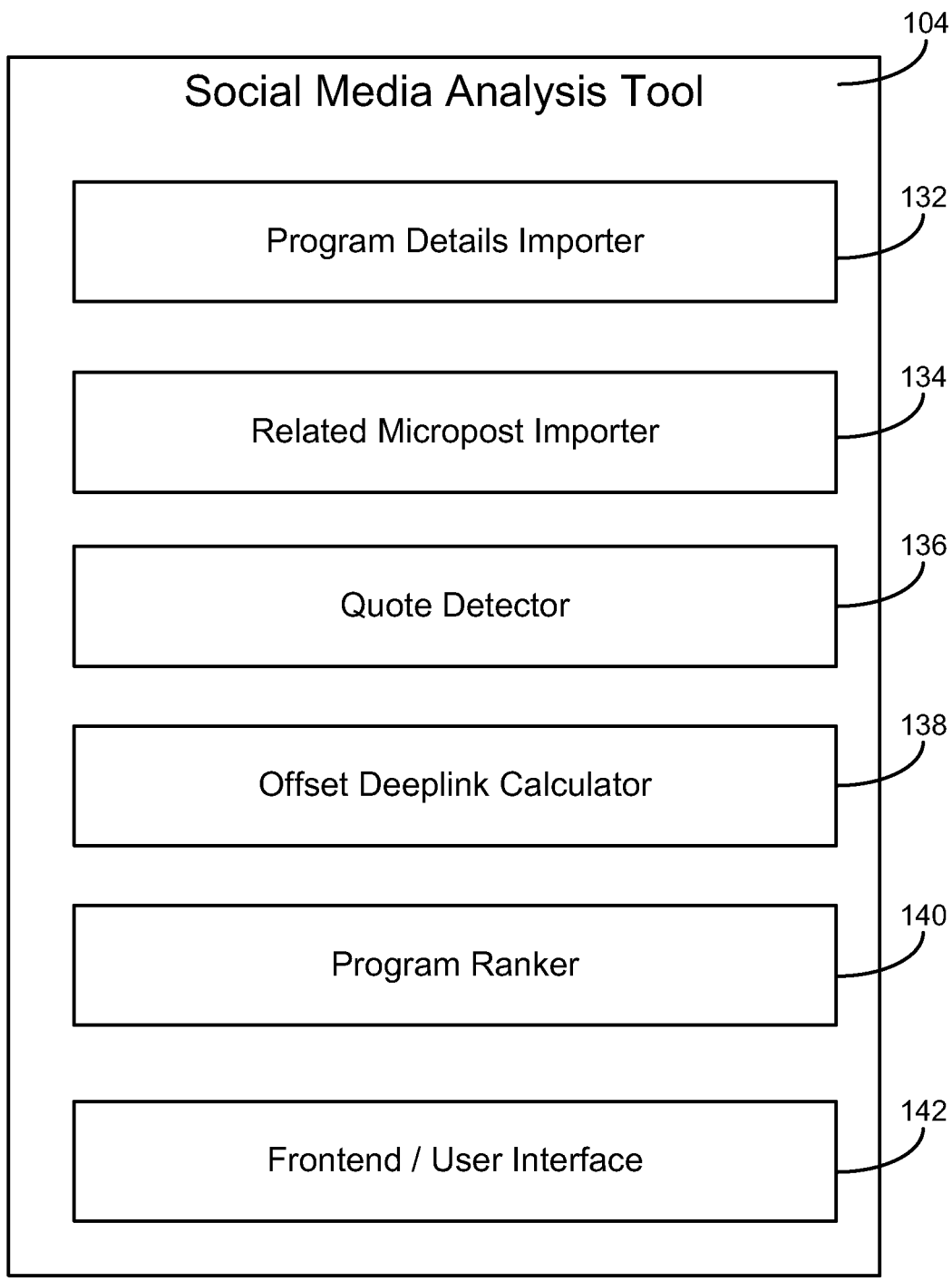
FIG. 1B is one component of the block diagram in FIG. 1A in accordance with an aspect of the present disclosure.

FIG. 1B is one component of the block diagram in FIG. 1A in accordance with an aspect of the present disclosure. Specifically, FIG. 1B shows social media analysis tool 104 and its components in detail. Social media analysis tool includes program details importer 132, related micropost importer 134, quote detector 136, offset deeplink calculator 138, program ranker 140 and frontend/user interface 142. All the components 132-142 of social media analysis tool 104 will be explained in detail below, particularly with reference to the description of FIG. 3.

Figure 2:
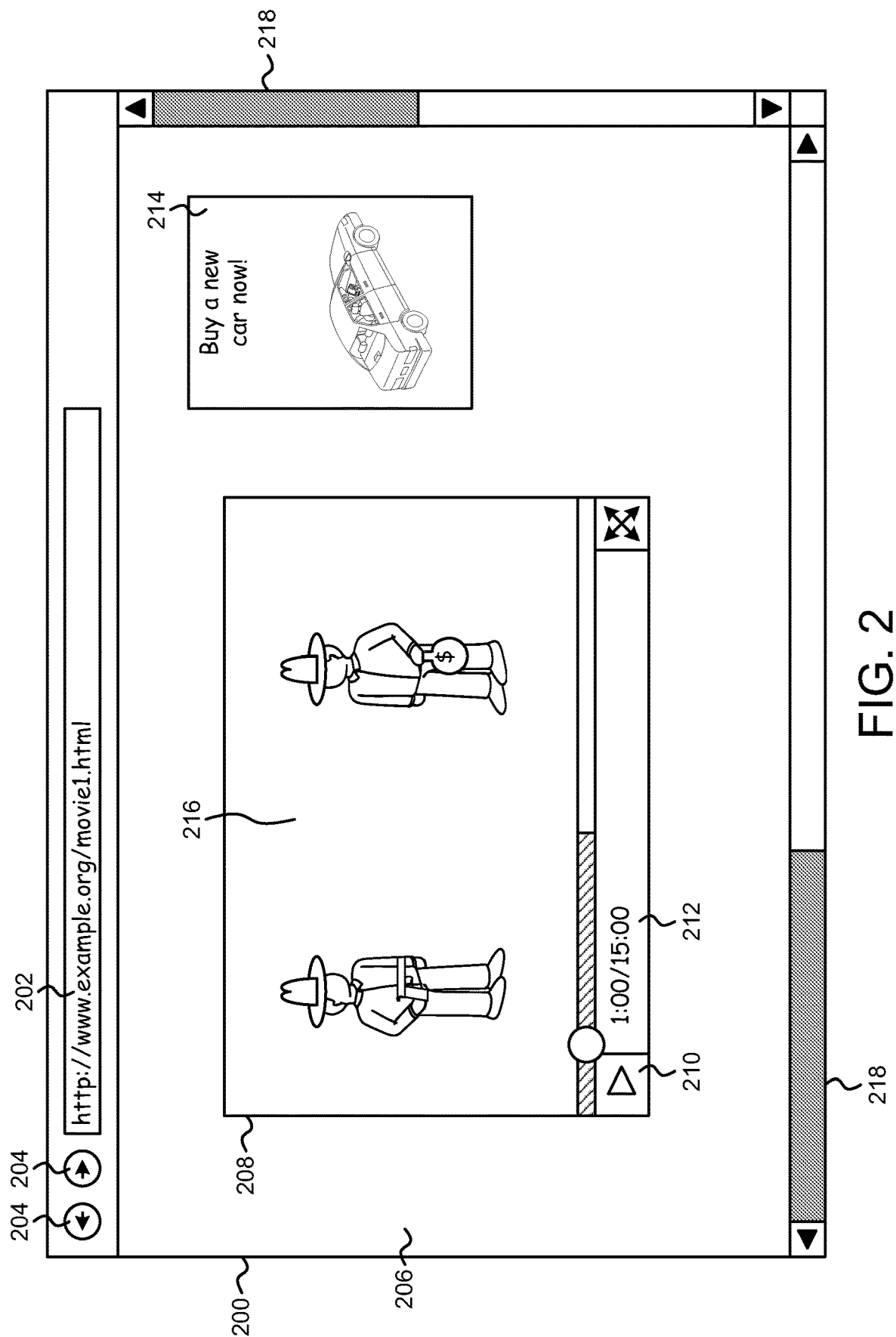
FIG. 2 is an illustration of a display showing an example web page, in accordance with an aspect of the present disclosure.

FIG. 2 is an illustration of a display showing an example web page, in accordance with an aspect of the present disclosure. Referring now to FIG. 2, an example display 200 is shown. Display 200 is in electronic communication with one or more processors that cause visual indicia to be provided on display 200. Display 200 may be located inside or outside of the housing of the one or more processors. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide web page data and/or other data to the client device, which causes visual indicia to be displayed by display 200.

The web browser providing data to display 200 may include a number of navigational controls associated with web page 206. For example, the web browser may include the ability to go back or forward to other web pages using inputs 204 (e.g., a back button, a forward button, etc.). The web browser may also include one or more scroll bars 218, which can be used to display parts of web page 206 that are currently off-screen. For example, web page 206 may be formatted to be larger than the screen of display 200 In such a case, one or more scroll bars 218 may be used to change the vertical and/or horizontal position of web page 206 on display 200.

In one example, additional data associated with web page 206 may be configured to perform any number of functions associated with movie 216. For example, the additional data may include a media player 208, which is used to play movie 216. Media player 208 may be called in any number of different ways. In some implementations, media player 208 may be an application installed on the client device and launched when web page 206 is rendered on display 200. In another implementation, media player 208 may be part of a plug-in for the web browser. In another implementation, media player 208 may be part of the web page data downloaded by the client device. For example, media player 208 may be a script or other form of instruction that \causes movie 216 to play on display 200. Media player 208 may also include a number of controls, such as a button 210 that allows movie 216 to be played or paused. Media player 208 may include a timer 212 that provides an indication of the current time and total running time of movie 216.

The various functions associated with advertisement 214 may be implemented by including one or more advertisement tags within the web page code located in "moviel.html', and/or other files. For example, "moviel.html" may include an advertisement tag that specifies that an advertisement slot is to be located at the position of advertisement 214. Another advertisement tag may request an advertisement from a remote location, for example, from an advertisement server, as web page 206 is loaded. Such a request may include client identification data (e.g., a cookie, device ID, etc.) used by the advertisement server as a user identifier. In this way, the advertisement server is able to determine browsing history associated with a user identifier as it is used to navigate between various web pages that participate in the advertising network (e.g., web pages that include advertisements from the advertisement server).

Figure 3:
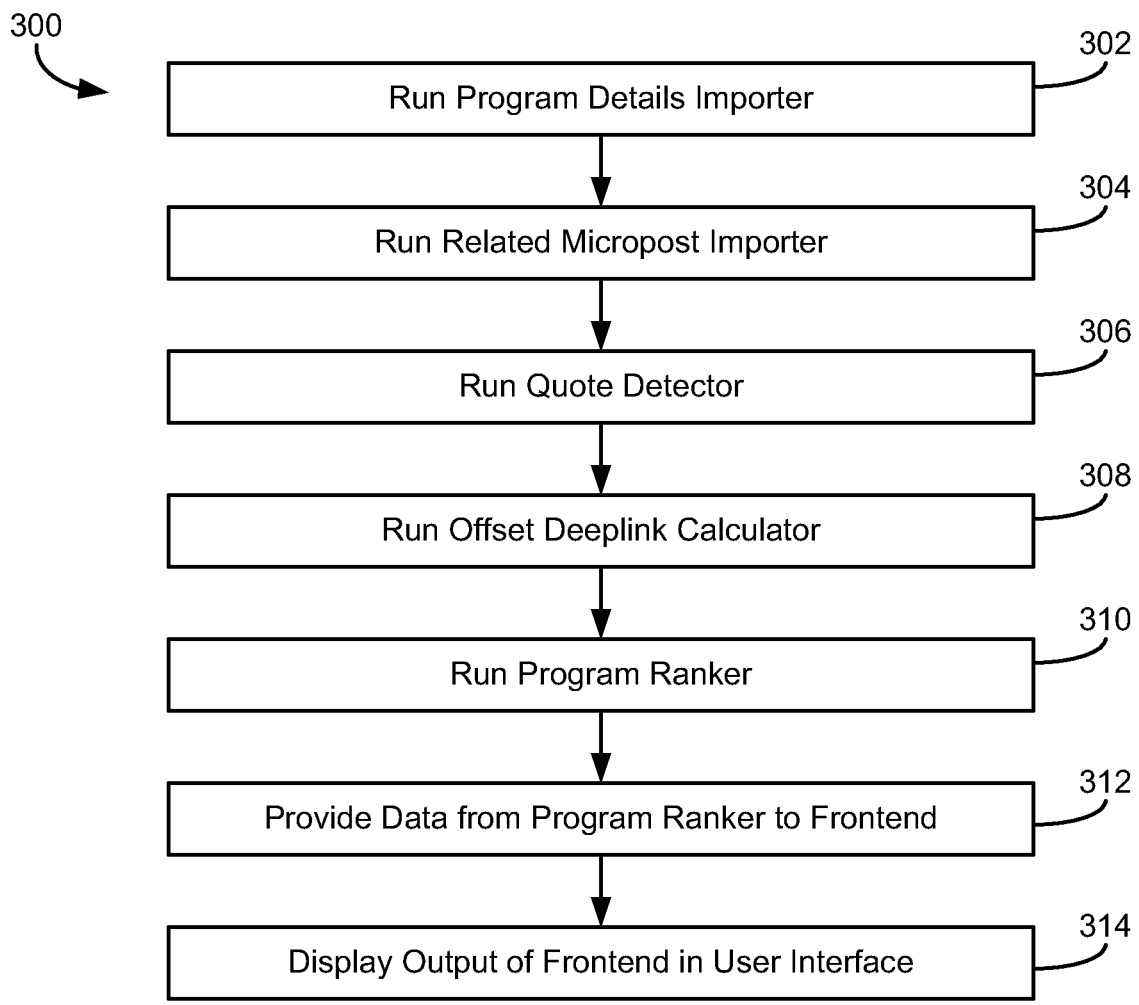
FIG. 3 is an example process for analyzing and organizing social media to discover the most interesting content and conveniently providing it to a user, in accordance with an aspect of the present disclosure.

FIG. 3 is an example process for analyzing and organizing social media to discover the most interesting content and conveniently providing it to a user, in accordance with an aspect of the present disclosure. Referring now to FIG. 3, process 300 is a process in which the social media analysis tool of the present disclosure can be used to analyze and organize social media to discover the most interesting content and conveniently provide it to a user.

In box 302, the program details importer is executed The program details importer is responsible for importing, for example. (a) the airing times (e.g., schedule) of all programs (online-based web series programs, television programs and similar broadcast programs), (b) links to program pages where they can be watched on-demand or online, (c) the subtitles for the programs, and (d) optionally other metadata for the program, such as, for example, the cast list, official hashtags or social media service usernames or identifiers for the program. This data may be typically acquired by parsing the web sites of TV/program broadcasters. The pipeline of the program details importer is run periodically (e.g., every 10 minutes or another predetermined time period) in order to import the details of all the new programs shortly after they become available to watch online. The program details importer outputs and stores the program's airing times, a link to the on-demand version of the program, subtitles, other metadata and possibly more. Note that the subtitles may be time stamped with the "presentation timestamp" (timestamp that stores time code and other information) for each subtitle line, and the system of the social media analysis tool stores this data as well. In one implementation, in addition to acquiring the program details from the broadcaster's website, it is also possible to acquire this data from other sources: for example, subtitles may be additionally acquired from the live airing of a program using a digital TV tuner connected to a server that is running software capable of parsing closed caption/subtitle information transmitted within the TV signal. In the US, closed captions are transmitted as defined by standards EIA-608 and CEA-708, for example, and in Europe they are transmitted as defined by standards ETSI EN 300 743 and ETSI EN 300 472, for example. The airing times and schedule of programs may additionally be acquired from an electronic program guide (EPG) company, and typically such data is transferred in extensible markup language (XNdL) format over file transfer protocol (FTP).

In box 304, the related micropost importer is executed. The related micropost importer may be executed once for each new program found by the above-described program details importer. The related micropost importer may be responsible for importing all microposts (or posts, messages, status updates from social media services) that are likely to be about a program, e.g., television show. A micropost is about a program when, for example: (a) the micropost was posted during the live airing of a program (as well as +/−N minutes before and after the program, N being determined by case studies and is a predetermined value that may be changed) and (b) the micropost includes a reference to the program name, a character name from the program, an actor name, an official social media service account of the program, an official hashtag or other social media identifier for the program and so on. The related micropost importer also outputs and stores all social media microposts that are likely to be about a given program.

In box 306, the quote detector is executed. The quote detector may be executed once after the related micropost importer is executed for each program. The quote detector is responsible for matching a program's microposts against the program's subtitles in order to find the subset of microposts containing "quoted moments" or moments that are actually quoted, spoken or that occur in a program. A micropost is considered to contain a quote from a program when X consecutive words from the micropost match X consecutive words from the subtitles or other caption/script data of the program. X may be determined by an algorithm, case studies and is a predetermined value that may also be changed. X also may be adjusted according to the variation of subtitles not exactly matching the microposts, or the microposts paraphrasing the content of the subtitles and not exactly matching every single word. For instance, a match could still occur with X consecutive words if every second, third or fourth word there is a match, or if words from the micropost sound or look similar (or contain substantially the same letters) as words from the transcript or subtitle/caption data. There are a variety of alternate approaches to matching that may not involve matching X consecutive words such as overall qualitative comparisons, boolean analysis or any other similar approach. For example, case-insensitive-but-exact matches between the micropost words and the subtitle/caption/script words may be used. Also, a Hamming distance analysis or a low Hamming distance between words may be looked at instead of looking for exact matches, wherein the Hamming distance between two strings of more or less equal length may be the number of positions at which the corresponding symbols may be different, or a measurement of the minimum number of substitutions required to change one string into the other or the number of errors that transformed one string to the other. As another example, X may be a number like 5 for word sequences that include "stop-words" (e.g., the, is, at, which, on), or a lower number like 3, for word sequences of uncommon words (words that are not common "stop-words" and that may be unique to a particular program). The quote detector outputs and stores all social media microposts that contain quoted moments as well as a reference to the matching sequence of words in subtitles/caption/scripts that contain the quoted moment. In one implementation, subtitles/caption/scripts may be XML, or stored in a particular type of language. In one implementation, a time period may be chosen (such as 10 seconds) to perform a detailed comparison. In one implementation, the closeness, frequency of subtitles may be used to indicate a conversation for matching purposes. In one implementation, the color or formatting of subtitles could be used for matching purposes, the colors or formatting usually indicating a particular type of scene or moment.

According to one implementation of the present disclosure, the above-described quote detector may not even be looking for matches in quotes but instead may be looking for matches in subject matter or content, e.g., if the micropost simply describes a summary of what occurred, the quote detector could use its algorithms to find generally what area of the program the summary corresponds to, based on the subtitle/caption data, the actors in the scene, or other time code information that would describe what happens at what time in an episode of a program.

In box 308, the offset deeplink calculator is executed. The offset deeplink calculator may be run once after the above-described quote detector for each program is run. The offset deeplink calculator is responsible for finding the exact time offset of a quote (of the quoted moment found in the quote detector), with respect to the beginning of an online video file corresponding to the specific episode of the program which the quote is spoken in (or where other matched data or action occurs in a program). In the example of quoted moments, for each micropost that contains a quoted moment, the offset deeplink calculator takes the matching sequence of words and finds the beginning of the sentence containing that sequence. As just an example, the process may works as follows: a search is performed in the program's subtitle data (stored in the program details importer) for the beginning of the sentence. The search may be a backwards search, a forwards search, a search starting from the middle and going to both directions, or otherwise an organized search that saves time, such as, for example, a search that narrows down where the given content might be and starts from there—e.g. if there are dialogue heavy scenes and scenes with little to no dialogue, then the search might start from the dialogue heavy scenes only. Assume the sequence of words quoted by the micropost is "jumped over the lazy dogs." The offset deeplink calculator searches for the beginning of the sentence and finds that the sentence starts as: "the quick brown fox jumped over the lazy dogs." The offset deeplink calculator may then determine the subtitle timestamp for the very beginning of the sentence to ensure that when the video for the moment is played back, the user hears and sees the complete sentence. In another implementation, the subtitle timestamp returned may be exactly where the quoted moment begins. The complete sentence version may be more of a preferable user experience, however. The timestamp may then be stored as an interesting quoted moment for the program. The offset deeplink calculator outputs and stores all the time offsets of "quoted moments" in a program, along with the potentially multiple associated microposts corresponding to each of those time offsets. The offset deeplink calculator is mentioned as a "deeplink calculator" because those time offsets are eventually used for deeplinks sent to the user, which the user can click on or access to be taken to a program at exactly the time offset value to enjoy the specific portion of the program quoted or summarized by the micropost.

In some implementations, there are ways that may give the user a better context that adopt the following variations.

In one implementation, some programs' subtitled may indicate that a different person has started speaking by (a) changing the color of the subtitles, (b) by including some signs (such as ">>" or "−" at the beginning of the new person's speech, or (c) by including the person's name before the speech (e.g., "Abe: How are you? Bob: I'm fine"). This information may be used, and going further back to the beginning of the quoted person's speech sometimes provides better context. In one implementation, in some cases (e.g., when the previous person asks a question), it may be preferable to go back to the beginning of the previous person's last sentence. In one implementation, in some cases it can be determined that the previous person's speech is contextually related to the quoted person's speech (for example, based on the occurrence of common topic keywords). In such a case, it may be preferable to go even further back to the beginning of the contextually-related uttering made by the previous person.

In some implementations, there may be other information associated with the video, such as the beginning of each chapter or scene. It is also possible to estimate scene changes by processing the video and looking for big, or larger, more major changes in background patterns. This information may sometimes be used to go back to the beginning of the scene that contains the quoted moment. In some implementations, the user may not be taken back more than N seconds in time, where N can be a small value such as 20 or less.

In box 310, the program ranker is run. The program ranker may be run periodically. The program ranker may also be responsible for identifying the most popular programs. The program ranker processes each program and determines the number of "quoted moments" in a given program as follows: (1) Each time offset generated by the "offset deeplink calculator" is considered a single quoted moment. (2) Multiple microposts referring to the same time offset in the program may be grouped together and counted as quoters of the same moment. (3) Programs may then be ranked by the number of "quoted moments" they have (e.g., the program with the most number of distinct quoted moments is considered to be the most interesting program with the highest rank). (4) "Quoted moments" of the same program are ranked by their number of quoters (e.g., the "quoted moment" with the most number of quoters is considered to be the most interesting moment in a program with the highest rank). (5) Microposts quoting the exact same moment are ranked by their length (e.g., the longest micropost is considered to be the most interesting micropost for a single moment) or other criteria such as how many indicators it has, how many hashtags it has, how much the micropost is shared or reposted. The output of the program ranker may be a list of programs (sorted by interestingness or highest ranked), each program containing a list of moments (sorted by interestingness or highest ranked), and each moment containing a list of microposts (sorted by interestingness or highest ranked).

In box 312, the data from the program ranker is provided to the frontend. The frontend serves the data generated by the program ranker to the user interface. The frontend does any necessary filtering to ensure that the user interface displays programs that can be played on the user's platform. For example, if the frontend is contracted by an iOS device which does not allow flash content be displayed, programs from websites that serve their videos in flash will not be included in the results served by the frontend. Alternatively, for websites that can serve videos in multiple formats (such as both flash and MP4), the frontend will pick the version of the video that may be most compatible with the user's device.

In box 314, the user interface displays the output of the frontend. The user interface (which may be, for example, a HTML user interface (UI) served from a web page, or a dedicated mobile application) displays the output of the frontend in an user-friendly way. The "most interesting" program is listed first, and the others may follow in order of decreasing interestingness (inferred from the number of quoted moments in the program). Each program may contain a link to the broadcaster's page where the program may be watched from the beginning, or the specific quoted moment can be watched via a deeplink. Both FIGS. 3-4 illustrate the user interface in more detail.

For each program, a limited number of (for example, three-four) "most interesting" microposts are displayed. Each micropost contains two links: the first one is a link to the social media service page hosting the original micropost, and the second is a deeplink into the specific time offset in the video content hosted on the broadcaster's site, e.g., the particular episode of that program. Clicking on the second link takes the user to the "interesting moment" quoted by that micropost which can be played instantly on the UI or another website or device. According to one implementation, the sense of "freshness" may be increased in the UI by grouping programs by their airing date, for example, and showing the most recent programs first. That is, today's programs are displayed first, then yesterday's programs, etc. Each data includes only those programs that have at least N (e.g., three-four) quoted moments. Each date's programs are also sorted by the number of "quoted moments" or summaries that they may have. In one implementation, subtitles may also be quoted as well, and may be shown instead of the micropost content arranged on the UI.

According to one implementation, a process may proceed with the following, but not limited to any particular order. All the subtitles (or related caption/script data) for all the programs are fetched, the programs being able to be streamed online. All the social media posts from social media services about the programs that have become available to stream online are fetched. All the fetched subtitles and fetched social media posts are joined together and all the "interesting moments" (where the subtitles and the social media posts match) are found. All the programs are ranked by the number of "interesting moments" that they have. All the social media posts are made playable by providing time-offset video deeplinks to the playable video content of the program. The program or parts of the program are personalized, promoted and shared via social media services by allowing other users who use other social media services to see the support/confirmation of the program and also allowing the sharing of such programs, which can all be done via a user interface such as a website.

Figure 4A:
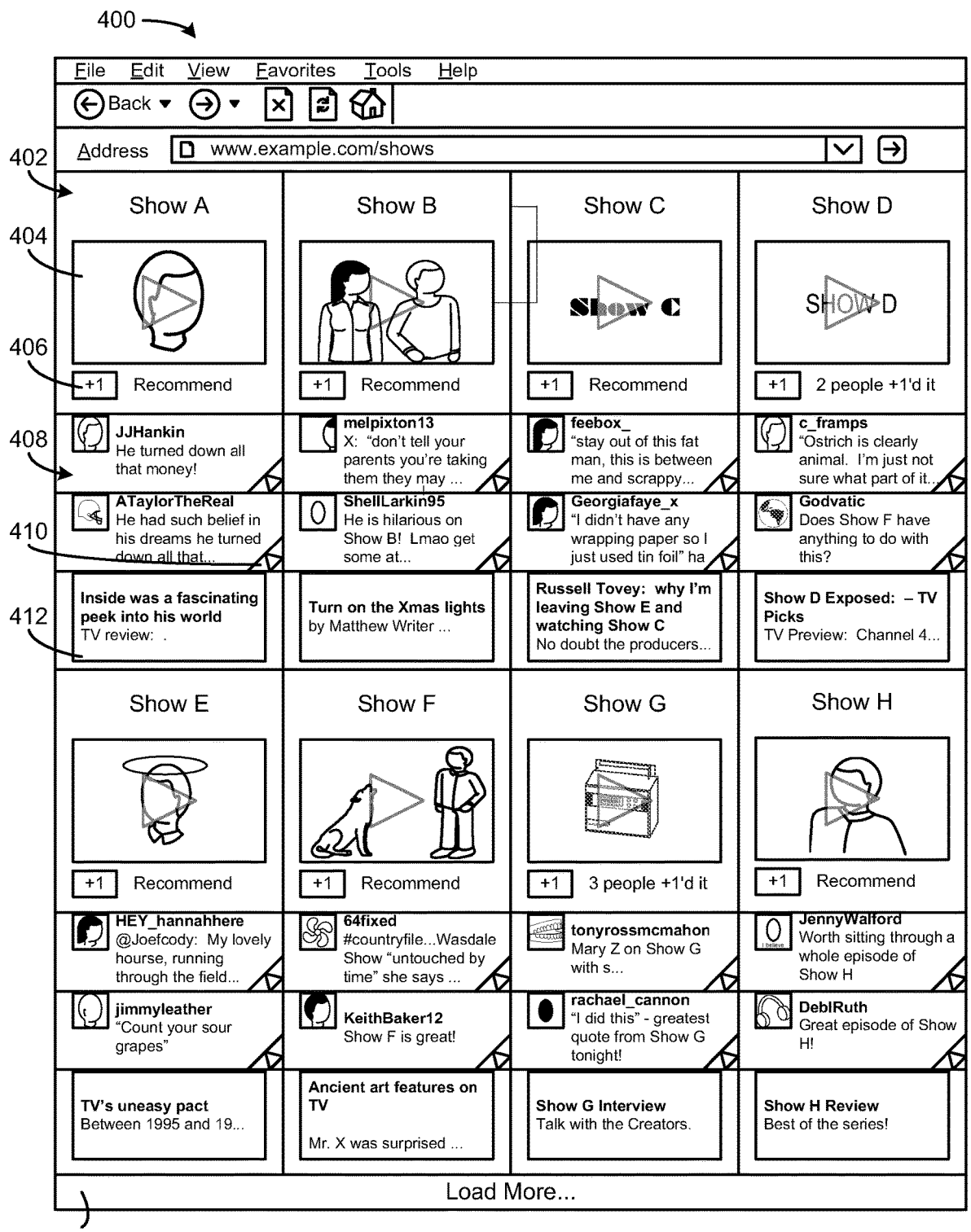
FIG. 4A is an example illustration of content showing social media organized by a social media tool on a website, for example, in accordance with an aspect of the present disclosure.

FIG. 4A is an example illustration of content showing social media organized by a social media tool on a website, for example, in accordance with an aspect of the present disclosure. Website 400 includes program panel 402, program link 404, affirmation button 406, micropost 408, video deeplink 410, program summary news byte 412, and loading area 414 In one implementation, website 400 may be a html page presented on a web browser. In one implementation, website 400 may be a dedicated mobile device application, or another software program that loads on any display such as a television connected to any device that provides content and/or an internet connection such as a video game console or other media data player. Program panel 402 contains all the relevant information for a given program or television/webbased program. In one implementation, the website 400 may organize the program panels 402 by "interestingness" or number of quoted moments or microposts from the program, e.g., the most interesting or popular program gets listed first, in the case of FIG. 4A, the upper, left most corner, and subsequent programs that decrease in "interestingness" or popularity get listed afterwards. In one implementation, the website 400 may organize program panels 402 based on a marketing scheme, e.g., listing the programs that have paid for more exposure to be listed first compared to the other programs which have not invested as much afterwards—these programs may also be clearly marked as sponsored results as well. In one implementation, the website 400 may organize the program panels 402 in a random order. In one implementation, the website 400 may organize the program panels 402 based on how recent a given program is relative to the others, or by their "freshness" or by their airdate, e.g. showing the most recent programs first, then yesterday's programs, and then so on. In one implementation, the website 400 may have a date, and each date may only include those programs which have a certain number of microposts or quoted moments, and each date's programs may also be sorted by the number of quoted moments that they have.

The program panel 402 usually includes a title of the program, at least one program link 404, at least one affirmation button 406, at least one micropost 408 (which in turn includes at least one video deeplink 410), and at least one program summary news byte 412. The title of the program is the name of the program, and alternate titles (in different countries, for example) may also be used, and what title is used may be chosen by the website 400, the broadcaster, the broadcaster's website, or by other parameters of the social media tool of the present disclosure.

The program link 404 is a link to the broadcaster's page where the program may be watched. In one implementation, the program link 404 links to the broadcaster's page where the most recent episode, the most popular episode or a selected episode can be played, most likely from the very beginning or at another specified timestamp. In one implementation, if the user clicks on video deeplink 410 on a micropost 408, they are taken to a specific offset in a specific episode. In one implementation, if the user clicks on program link 404 on a micropost 408, then the user is taken to the very beginning of that same specific episode. The specific episode contains all of the quoted moments listed in the micropost 408 In one implementation, the most recent episode, the most popular episode or a selected episode may be played directly in a small video window directly on website 400 by clicking on the program link 404. The most recent episode, the most popular episode or a selected episode may be chosen by the broadcaster, the broadcaster's website, the website 400 or other parameters of the social media tool of the present disclosure. The thumbnail that appears where the program link 404 appears may also be selected by the broadcaster, the broadcaster's website, the website 400, or other parameters of the social medial tool of the present disclosure.

The affirmation button 406 provides a way for users of social media services or viewers of the website 400 to view how many people (or others) support, like or confirm this particular program or episode of the program. For instance, if a user browsing the website 400 is registered with a social media service, then he or she will have the option to affirm, vote, support, like or confirm this show by clicking on the affirmation button 406. The support of this program will then appear in his social media service as either a post or status update, and other users in his or her social network will see it. Furthermore, the user will also be able to see which one of their friends from their social network in the social media service have also liked, supported, affirmed or confirmed the given program—both when logged into their social media service and directly on the website 400 itself (e.g., next to the affirmation button 406 it might say "User A, User B, User C and 1,000 more people like/support this" wherein Users A-C are friends or contacts of the user browsing the website 400 in a social media service). Users may also use the affirmation button 406 to "share" or repost this link (the affirmation button 406 might even take the appearance of a "share" or "repost" icon with the word used or similar pictures) in their social media service for other users to see—the link that can be shared may either be a direct link to the broadcaster's site where video can be played, a link to the broadcaster's site about the program generally describing the program, a direct link to the website 400 or just a portion of the website 400 such as the specific program panel 402 of the website 400 (blown up, for example), a direct video link to the linked content playable directly from the social media service or any other such interactive link. In one implementation, more than one affirmation button 406 may appear, each one linked to a different social media service, and each one performing the functionality described above. In one implementation, the social media signals generated by users clicking on affirmation button 406 may also be used to assess the popularity of a program, and therefore change the ordering of the programs. For example, if program 1 and program 2 have the same number of quoted moments, and program 2 has more affirmations than program 1, then program 2 may be considered to be the more popular program, and therefore is displayed before program 1 in the user interface.

Micropost 408 is a "quoted moment" micropost generated from the above described processes, and each micropost 408 may also have a link to the social media service page hosting the original micropost and at least one video deeplink 410. In one implementation, the microposts 408 listed on program panel 402 may be organized based on interestingness, such as, how many times it was shared or reposted or liked/supported/confirmed on a social media service, or how accurate the micropost describes the quoted moment that is the most popular (that has the most microposts about) of the program, or by some other criteria. In one implementation, the microposts listed may be organized in a completely random fashion. In one implementation, the number of microposts may be limited to a lower number like 3-5 in order to only provide users a brief idea of the quoted moments in the program, or a higher number 10+ in order to show users the spectrum of different quoted moments in a program. In one implementation, there needs to be enough quoted moments to generate microposts on the program panel 402, so the microposts 408 may only appear on the program panel 402 if there are enough quotable moments on a program to draw from, which also denotes how "interesting" a program is (the number of quoted moments that apply to it). Again, each micropost 408 may contain a link to the social media service page hosting the original micropost and the video deeplink 410.

Video deeplink 410 is a deeplink into the specific time offset in the video content that may be hosted on the broadcaster's site, determined by the above-described processes and algorithms. By clicking on the video deeplink 410, the user is taken to the "interesting moment" discussed or quoted in that micropost, and is able to view a clip of where exactly in the program the moment begins and also ends. In one implementation, the user can be taken to where exactly in the program the quoted moment begins and be allowed to watch the rest of the program. The video deeplink 410 may also link directly to the broadcaster's site where the episode or video content is hosted. In one implementation, the video deeplink 410 may allow the time-offset video content to play directly on the web site 400, e.g., a window opens up on the website 400 or in the micropost 408 that plays the video, or by another way. In one implementation, the video deeplink 410 may link to a specialized media player hosted by the broadcaster or the website 400 that not only allows the user to play the time-offset video content in that selected episode, but also allows the user to play from other episodes related to the one selected by the video deeplink 410.

Program summary news byte 412 may provide a link to an interesting or much buzzed about online article involving the program displayed by program panel 402. In one implementation, the user is taken to a separate news site where the online article was published and can read it from that website. In one implementation, the reader may be able to read the article directly on website 400 either by a separate window opening up and the article being displayed there, or by the article expanding out into the program panel 402 and being able to be read there. The way that the program summary news byte 412 may be chosen could be something set by the parameters of the broadcaster, the broadcaster's website, the website 400, or other parameters of the social media tool used by the present disclosure. For example, an article or press site that has paid either the broadcaster or the website 400 to display their articles may be the article that pops up in program summary news byte 412. As another example, an article that is popularly cited or shared the most in various social networks (the popularity of the citation being calculated by any algorithm used to calculate such a metric) is the article that is shown in the program summary news byte 412.

Loading area 414 is where the website 400 may load more program panels 402. In order to conserve resources of the display showing the website 400 or the browser/program displaying the website 400, the website 400 may only decide to display a certain pre-selected number of program panels 402 on one page—in the case of FIG. 4A, this is eight, although the number of program panels 402 chosen to be displayed can be any number. The loading area 412 is a bar that when clicked displays the next number of program panels 402. In one implementation, the previously displayed program panels 402 may disappear (and possibly replaced with a button similar to loading area 414 but saying something instead like "load previous" or "see previous") and only the presently selected program panels 402 may be visible. In one implementation, all of the previously displayed program panels 402 may still be visible but have to be scrolled up in order to see, and now also the newly loaded program panels 402 that result after clicking the loading area 414 are still being displayed. The pre-selected number of program panels 402 to display on one given screen of the website 400 may be determined by the parameters of the device the website 400 is displayed on. For example, the number might be much higher if a computer screen is used to display the website 400 on an internet browser, whereas the number might be much lower if the website 400 is being displayed on a mobile device via a mobile application such as a web browser, for example. In one implementation, more recommendations or items may be loaded on the website 400 by simply scrolling down. This may be preferable, because the user does not have to click or tap on any buttons to load more elements, but as he or she scrolls towards the end of the current set of results on a current screen, more results are loaded automatically and added to the end of the list for instant display to the user.

Figure 4B:
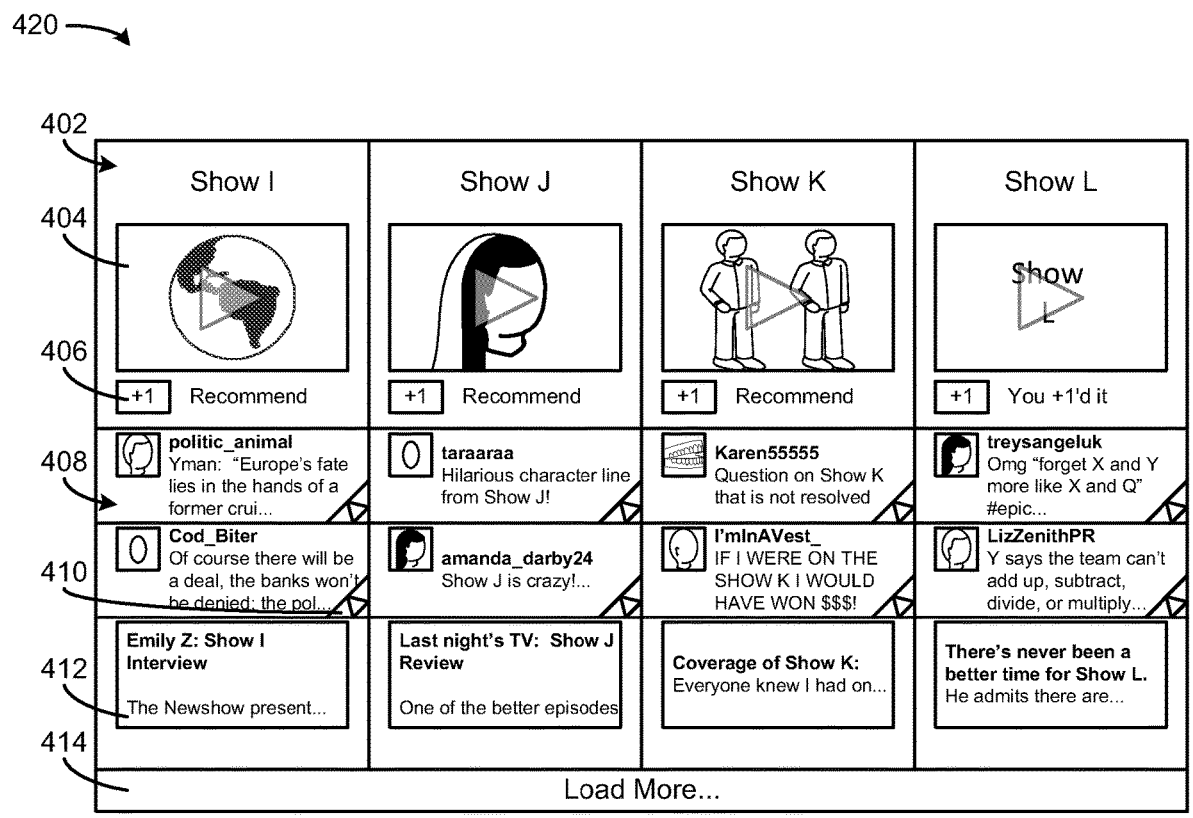
FIG. 4B is another example illustration of content showing social media organized by the social media tool on a website, for example, in accordance with an aspect of the present disclosure.

FIG. 4B is another example illustration of content showing social media organized by the social media tool on a website, for example, in accordance with an aspect of the present disclosure. Alternate website 420 shows program panel 402, program link 404, affirmation button 406, micropost 408, video deeplink 410, program summary news byte 412, and loading area 414. The descriptions of the above components for FIG. 4B are identical to the descriptions of the same components for FIG. 4A. The main difference between FIG. 4B and FIG. 4A is that FIG. 4B shows just four program panels 402 as opposed to eight, as shown in FIG. 4A. This therefore illustrates how the number of program panels 402 can be adjusted according to a variety of parameters. The fewer number of program panels 402 shown in FIG. 4B may be used, for example, in a mobile device via a mobile application where screen size is limited. Furthermore, the number of program panels 402 displayed does not need to be four and can be any number decided by the parameters or other specifications of the display device. Also, when the loading area 414 is pressed, the next number of program panels 402 may be displayed, with the previously displayed program panels 402 accessible via a similar button/feature as the loading area 414 but saying something such as "load previous" or "see previous" instead. In the situation of a mobile device viewing a mobile application, the number of program panels 402 may be smaller or greater than four, but should be around that number or less than 10, and each screen of the alternate website 420 may only show the preselected number of program panels 402 at a time, with the previous/next buttons available as well on the top or the bottom.

Figure 5:
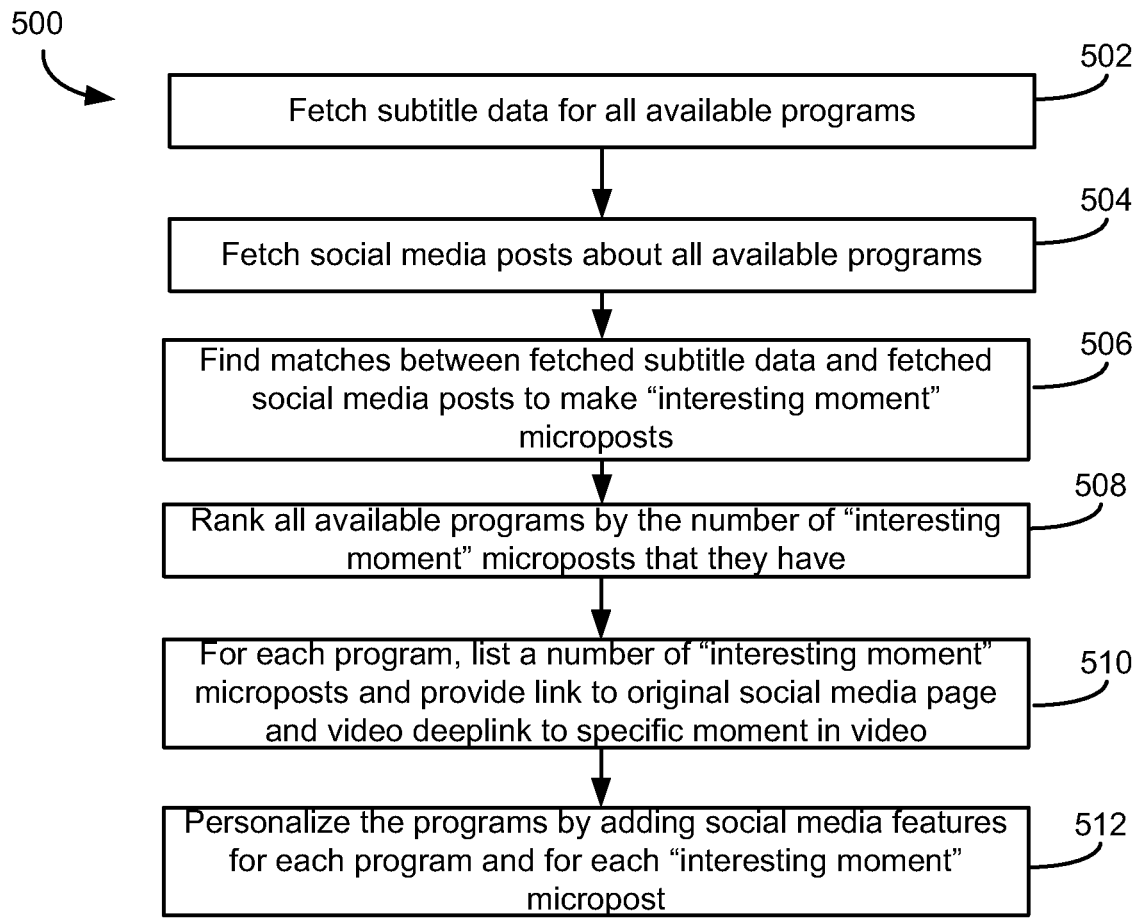
FIG. 5 is another example process for analyzing and organizing social media to discover the most interesting content and conveniently providing it to a user, in accordance with an aspect of the present disclosure.

FIG. 5 is another example process for analyzing and organizing social media to discover the most interesting content and conveniently providing it to a user, in accordance with an aspect of the present disclosure. Process 500 is a process in which the social media analysis tool of the present disclosure can be used to analyze and organize social media to discover the most interesting content and conveniently provide it to a user. In box 502, the subtitle data is fetched for all available programs. The subtitle data can also include caption and other script data, and the programs may be television programs or other web-based programs. The subtitle data may be stored on a particular database or available via the broadcaster's site or another location where they would store such information. In box 504, all the social media posts about the relevant programs are fetched, the social media posts being posted by users who are registered with any social media service. The fetching of social media posts in box 504 may also be done around the same time that certain episodes or popular episodes of a given program air, or a set time after the episodes air, in order to ensure all the relevant posts can be collected and to narrow the pool of social media posts to search. The pool of social media posts to search and fetch from may also be further narrowed by means of the use of hashtags, tagging the social media profile of a program, mentioning character names from a program or other ways. In box 506, matches between the fetched subtitle data and the fetched social media posts are made in order to make "interesting moment" microposts. The matching can occur with a wide variety of algorithms or processes, as discussed above. For instance, string matches, Hamming analyses, matches every number of words or qualitative analyses can all be used to match the subtitle data with the social media posts. Furthermore, matches are not limited to merely direct matches of quotations but also include summaries of certain notable things that may have occurred in an episode. Once there have been matches between social media posts, these matched social media posts become "interesting moment" microposts that also have stored time locations of exactly where in the program the social media post is quoting or talking about. In box 508, all the available programs are ranked by the number of "interesting moment" microposts that they have—for instance, as just an example, the program that has the most "interesting moment" microposts may be ranked the highest, and the one with the least, the lowest, or vice versa. In box 510, for each program, a list of a number of "interesting moment" microposts are provided, each of the microposts providing a link to the original social media page hosting the original post and a video deeplink to the specific time offset moment in the program episode that the micropost is talking about. In one implementation, this information can be conveniently displayed to the user in a convenient, easy-to-navigate user interface such as the websites 400 and 420 shown in FIGS. 4A and 4B Furthermore, with one option of many shown in FIGS. 4A and 4B, one component of the user interface (such as program panel 402) may organize all the "interesting moment" microposts, and each of the microposts might contain clickable links to the original social media post and the playable video deeplink, which may play on a separate site or be played directly on the user interface itself. In box 512, the programs (as displayed via the user interface, for example) may be personalized by adding social media features. For instance (and as shown in FIGS. 4A and 4B), a confirmation/support/affirmation button or tool (such as affirmation button 406) can be used to confirm, like, support, affirm or share the program, a selected "interesting moment" micropost or other aspects about a program (select video clip, direct links to entire episodes and so on).

In one implementation, the above-described features of the present disclosure may be used with a TV platform that merges an internet browser or operating system geared for internet browsing with a television service in order to provide an interactive internet television experience. In one implementation, the interactive internet TV platform may allow browsing or interacting with TV elements on a larger display that may be found on a TV. In one implementation, the interactive internet TV platform may be made compatible with or operative to adapt to different input devices such as sophisticated remote controls, smart phones, keyboard devices, mouse devices, DVD, blu-ray or media disc players, and other such input devices. In one implementation, the interactive internet TV platform may be made compatible with or operative to adapt to different software-based applications, such as software applications that immediately link the interactive internet TV platform with playable or instantly downloadable content such as movies, TV shows, video games and other such media, or applications dedicated entirely to music, finance, sports, or other interest areas.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface (GUI) or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A method for presenting media content, the method comprising:
    comparing, for each of a plurality of media programs, subtitle data for a media program of the plurality of media programs with text data from each of a plurality of social media posts;
    determining, based on comparing the subtitle data with the text data, a plurality of different portions of the subtitle data for the media program that match at least one of the plurality of social media posts; and
    causing at least one of the plurality of media programs to be presented for selection by a user based on the plurality of different portions of the subtitle data for each media program that match at least one social media post.

2. The method of claim 1, further comprising:
    identifying, for each social media post with the text data determined to match a portion of the subtitle data of one of the plurality of media programs, timestamp data associated with the subtitle data that matches the text data;

identifying time offset data corresponding to the subtitle data that matches the text data based on the timestamp data; and creating at least one micropost using the time offset data corresponding to the subtitle data that matches the text data within the at least one of the plurality of media programs to generate a video deeplink that plays a time-offset video starting from the time offset data.

3. The method of claim 2, wherein identifying time offset data comprises determining a time offset value in an episode of the media program which the at least one social media post matches where the text data from a matching location begins, wherein the time offset value comprises a time offset value where the text data exactly begins and a time offset value starting from a beginning of a sentence where the text data exactly begins and a time offset value starting from the beginning of a scene where the text data exactly begins.

4. The method of claim 2, wherein ranking the plurality of media programs comprises:
determining microposts that refer to a same matched locations;
grouping the microposts that refer to the same matched locations; and
ranking the plurality of media programs based on a number of groups of microposts associated with each of the plurality of media programs.

5. The method of claim 2, wherein causing at least one of the plurality of media programs to be presented for selection by a user based on ranking comprises:
causing the at least one of the plurality of media programs to be presented in a program panel in a user interface presented by a user device, wherein the user interface loads a predetermined number of program panels on a screen at one time, and wherein the program panel comprises a title of each media program, at least one program link, at least one social media affirmation button, the at least one micropost, at least one program summary news byte, and at least one loading area; and
causing a clicked item on the user interface to be presented by the user device presenting the user interface.

6. The method of claim 5, wherein selection of the at least one program link causes an episode of a corresponding media program to be presented by the user device, selection of the at least one social media affirmation button facilitates sharing of the at least one media program to at least one social media service, selection of the at least one program summary news byte causes a news item that to be loaded by the user device, and selection of the at least one loading area causes more program panels to be loaded in the user interface.

7. The method of claim 5, wherein selection of the video deeplink causes the media program corresponding to the video deeplink to be presented by the user device from a starting point corresponding to the time offset data until an ending point corresponding to an end of a scene discussed in the at least one micropost.

8. A system for presenting ranked media content, the system comprising:
a hardware processor that is configured to:
compare, for each of a plurality of media programs, subtitle data for a media program of the plurality of media programs with text data from each of a plurality of social media posts;
determine, based on comparing the subtitle data with the text data, a plurality of different portions of the subtitle data for the media program that match at least one of the plurality of social media posts; and
cause at least one of the plurality of media programs to be presented for selection by a user based on the plurality of different portions of the subtitle data for each media program that match at least one social media post.

9. The system of claim 8, wherein the hardware processor is further configured to:
identify, for each social media post with the text data determined to match a portion of the subtitle data of one of the plurality of media programs, timestamp data associated with the subtitle data that matches the text data;
identify time offset data corresponding to the subtitle data that matches the text data based on the timestamp data; and
create at least one micropost using the time offset data corresponding to the subtitle data that matches the text data within the at least one of the plurality of media programs to generate a video deeplink that plays a time-offset video starting from the time offset data.

10. The system of claim 9, wherein identifying time offset data comprises determining a time offset value in an episode of the media program which the at least one social media post matches where the text data from a matching location begins, wherein the time offset value comprises a time offset value where the text data exactly begins and a time offset value starting from a beginning of a sentence where the text data exactly begins and a time offset value starting from the beginning of a scene where the text data exactly begins.

11. The system of claim 9, wherein ranking the plurality of media programs comprises:
determining microposts that refer to a same matched locations;
grouping the microposts that refer to the same matched locations; and
ranking the plurality of media programs based on a number of groups of microposts associated with each of the plurality of media programs.

12. The system of claim 9, wherein causing at least some of the plurality of media programs to be presented for selection by a user based on ranking comprises:
causing the at least one of the plurality of media programs to be presented in a program panel in a user interface presented by a user device, wherein the user interface loads a predetermined number of program panels on a screen at one time, and wherein the program panel comprises a title of each media program, at least one program link, at least one social media affirmation button, the at least one micropost, at least one program summary news byte, and at least one loading area; and
causing a clicked item on the user interface to be presented by the user device presenting the user interface.

13. The system of claim 12, wherein selection of the at least one program link causes an episode of a corresponding media program to be presented by the user device, selection of the at least one social media affirmation button facilitates sharing of the at least one media program to at least one social media service, selection of the at least one program summary news byte causes a news item that to be loaded by the user device, and selection of the at least one loading area causes more program panels to be loaded in the user interface.

14. The system of claim 12, wherein selection of the video deeplink causes the media program corresponding to the video deeplink to be presented by the user device from a starting point corresponding to the time offset data until an ending point corresponding to an end of a scene discussed in the at least one micropost.

15. A non-transitory computer-readable medium containing computer executable instructions that, when executed by a processor, cause the processor to perform a method for presenting ranked media content, the method comprising:
   comparing, for each of a plurality of media programs, subtitle data for a media program of the plurality of media programs with text data from each of a plurality of social media posts;
   determining, based on comparing the subtitle data with the text data, a plurality of different portions of the subtitle data for the media program that match at least one of the plurality of social media posts; and
   causing at least one of the plurality of media programs to be presented for selection by a user based on the plurality of different portions of the subtitle data for each media program that match at least one social media post.

16. The non-transitory computer-readable medium of claim 15, wherein the method further comprises:
   identifying, for each social media post with the text data determined to match a portion of the subtitle data of one of the plurality of media programs, timestamp data associated with the subtitle data that matches the text data;
   identifying time offset data corresponding to the subtitle data that matches the text data based on the timestamp data; and
   creating at least one micropost using the time offset data corresponding to the subtitle data that matches the text data within the at least one of the plurality of media programs to generate a video deeplink that plays a time-offset video starting from the time offset data.

17. The non-transitory computer-readable medium of claim 16, wherein identifying time offset data comprises determining a time offset value in an episode of the media program which the at least one social media post matches where the text data from a matching location begins, wherein the time offset value comprises a time offset value where the text data exactly begins and a time offset value starting from a beginning of a sentence where the text data exactly begins and a time offset value starting from the beginning of a scene where the text data exactly begins.

18. The non-transitory computer-readable medium of claim 16, wherein ranking the plurality of media programs comprises:
   determining microposts that refer to a same matched locations;
   grouping the microposts that refer to the same matched locations; and
   ranking the plurality of media programs based on a number of groups of microposts associated with each of the plurality of media programs.

19. The non-transitory computer-readable medium of claim 16, wherein causing at least some of the plurality of media programs to be presented for selection by a user based on ranking comprises:
   causing the at least one of the plurality of media programs to be presented in a program panel in a user interface presented by a user device, wherein the user interface loads a predetermined number of program panels on a screen at one time, and wherein the program panel comprises a title of each media program, at least one program link, at least one social media affirmation button, the at least one micropost, at least one program summary news byte, and at least one loading area; and
   causing a clicked item on the user interface to be presented by the user device presenting the user interface.

20. The non-transitory computer-readable medium of claim 19, wherein selection of the at least one program link causes an episode of a corresponding media program to be presented by the user device, selection of the at least one social media affirmation button facilitates sharing of the at least one media program to at least one social media service, selection of the at least one program summary news byte causes a news item that to be loaded by the user device, and selection of the at least one loading area causes more program panels to be loaded in the user interface.

21. The non-transitory computer-readable medium of claim 19, wherein selection of the video deeplink causes the media program corresponding to the video deeplink to be presented by the user device from a starting point corresponding to the time offset data until an ending point corresponding to an end of a scene discussed in the at least one micropost.

* * * * *